United States Patent [19]

Machida et al.

[11] Patent Number: 4,486,771
[45] Date of Patent: * Dec. 4, 1984

[54] AUTOMATIC WHITE ADJUSTING CIRCUIT FOR A TELEVISION CAMERA

[75] Inventors: Toyotaka Machida, Kashiwa; Teruaki Noda, Noda; Yuichi Ikemura, Nagareyama, all of Japan

[73] Assignee: Victor Company of Japan, Ltd., Yokohama, Japan

[*] Notice: The portion of the term of this patent subsequent to Apr. 26, 2000 has been disclaimed.

[21] Appl. No.: 475,216

[22] Filed: Mar. 14, 1983

Related U.S. Application Data

[63] Continuation-in-part of Ser. No. 269,126.

[30] Foreign Application Priority Data

Feb. 6, 1980 [JP] Japan ................................ 55-73856

[51] Int. Cl.³ ............................................ H04N 9/535
[52] U.S. Cl. ............................................... 358/29
[58] Field of Search ................... 358/29, 10, 139, 168, 358/169, 209

[56] References Cited

U.S. PATENT DOCUMENTS

| 3,670,100 | 6/1972 | Briggs | 358/29 |
| 4,249,197 | 2/1981 | Van Spaandonk | 358/29 |
| 4,274,107 | 6/1981 | Tamura | 358/29 |
| 4,368,482 | 1/1983 | Machida et al. | 358/29 |
| 4,381,520 | 4/1983 | Machida et al. | 358/29 |

FOREIGN PATENT DOCUMENTS

| 2448505 | 4/1976 | Fed. Rep. of Germany . |
| 2605018 | 8/1977 | Fed. Rep. of Germany . |
| 3032634 | 3/1981 | Fed. Rep. of Germany . |
| 2061661 | 5/1981 | United Kingdom ................ 358/29 |

Primary Examiner—Tommy P. Chin
Attorney, Agent, or Firm—Ladas & Parry

[57] ABSTRACT

An automatic white adjusting circuit for a television camera in which a rough adjustment is first performed with an adjustment quantity of large steps, and fine adjustment is secondly performed with an adjustment quantity of small steps, upon automatic adjustment of the white by performing such operations as directing the television camera towards a white surface. According to the automatic white adjusting circuit of the present invention, the adjusting accuracy of the white balance can be improved, and the white adjustment can be performed automatically within a short period of time.

8 Claims, 16 Drawing Figures

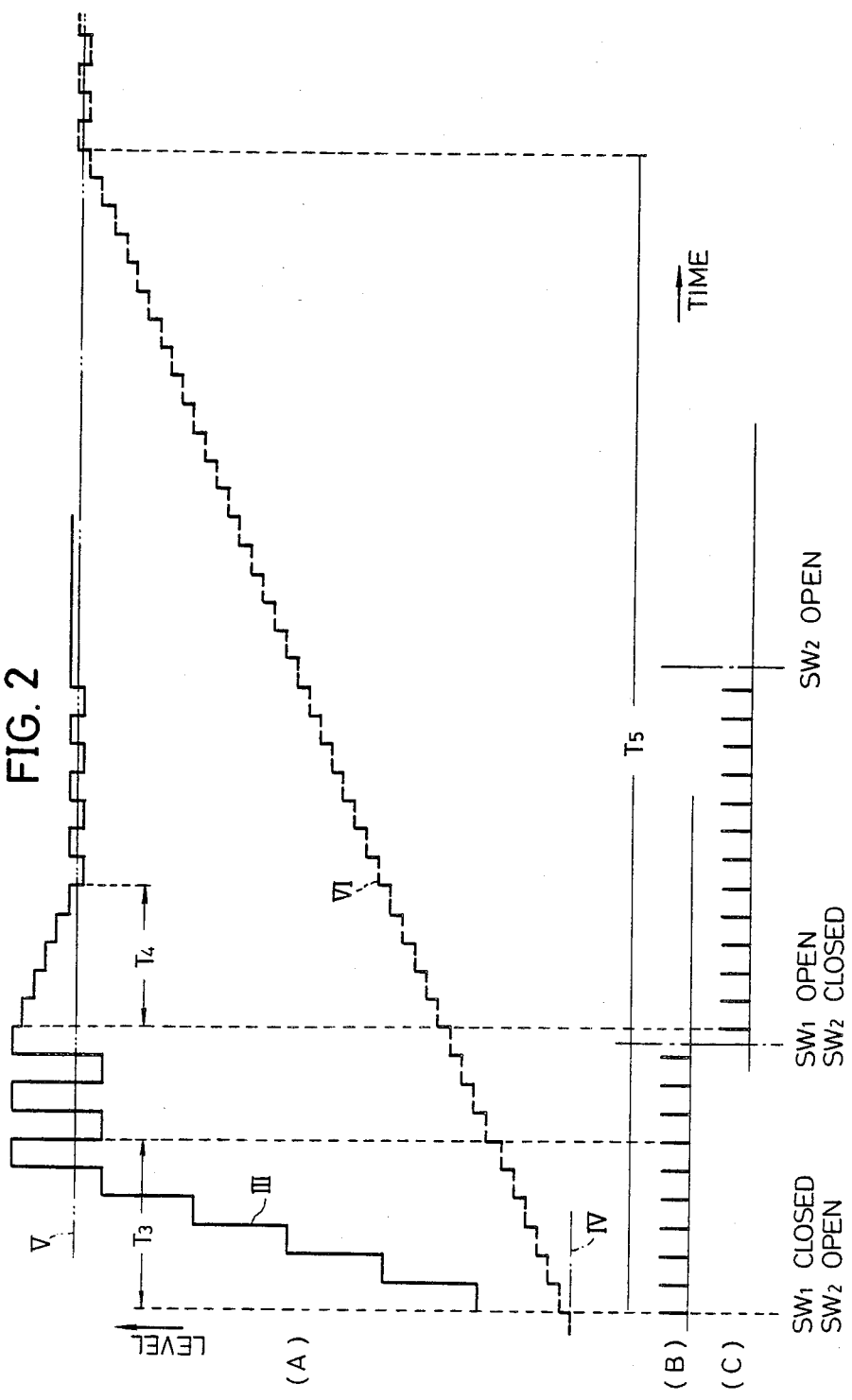

AUTOMATIC WHITE ADJUSTING CIRCUIT FOR A TELEVISION CAMERA

BACKGROUND OF THE INVENTION

The present application is a continuation-in-part Application of the U.S. Patent Application Ser. No. 269,126 filed June 1, 1981, now U.S. Pat. No. 4,381,520.

The present invention relates generally to automatic white adjusting circuits for television cameras, and more particularly to an automatic white adjusting circuit for a television camera in which the adjustment of the white is performed automatically by a simple operation of directing the television camera towards a white surface.

Conventionally, in a high-grade television camera fo business use, an automatic white adjusting circuit is provided to automatically adjust the white (correct the color temperature), so that the tint of an output signal of the color television camera does not change due to the color temperature of the illumination light source. This automatic white adjusting circuit uses a theory that, when picking up an image of a white object, the three primary colors of red, green, and blue lights must be of the same level, and adjusts the respective output signals of the three primary colors so that the three levels become the same.

There have been many kinds of conventional automatic white adjusting circuits in which an analog or a digital system is used. However, the conventional circuits all suffered disadvantages in that a plurality of operating buttons were provided which were troublesome to operate. In addition, in the analog systems, there was a disadvantage in that the automatic white adjusting circuit as a whole became costly because of the high cost of the analog memories. Therefore, it was not possible to apply such an automatic white adjusting circuit of the television camera for business use, to a desired television camera for home use.

Furthermore, the television camera for business use is designed under the assumption that it will be operated by a professional operator, and requires the adjustment of the white every time the voltage source is applied to the television camera. Thus, also from this point of view, the above automatic white adjusting circuit was not applicable to the television camera for home use.

A conventional portable color television camera is supplied with a voltage from a voltage source of a portable video tape recorder. This type of a portable video tape recorder shuts the voltage source off, when the tape travel mode is set to a stop mode, to reduce the power consumption. Accordingly, when the video tape recorder is set to the stop mode, the voltage source of the television camera is also cut off.

Therefore, in the automatic white adjusting circuit using digital memories, there was a disadvantage in that the content of the digital memory is destroyed when the voltage source is shut off, requiring the adjustment of the white every time the image pick-up operation is performed. Accordingly, the operation became troublesome to perform, and it was impossible to perform the image pick-up operation with a desired timing.

To overcome the above described disadvantages, the television camera may be provided with its own battery, so that the content of the digital memory can be kept in the same state, even when the video tape recorder is in the stop mode. However, by providing the television camera with its own battery, both the weight and the size of the television camera increase, thus resulting in the disadvantage in that, reducing of the weight and size demanded from a portable television camera cannot be met.

On the other hand, when the automatic white adjusting circuit is constructed by using analog memories, the television camera does not require its own battery since the analog memory content does not change when the voltage source is put on or off. But the content of the analog memory is slowly destroyed with time due to natural discharge, and thus requires a circuit to reduce this natural discharge. This results in high cost, suffering a disadvantage in that, it is not suitable for television cameras for home use from which low cost is demanded.

Therefore, an automatic white adjusting circuit which is especially effective when applied to a color television camera for home use, comprising simple circuit construction and in which the white is automatically adjusted by a simple operation, was highly desired.

In the color television systems presently being used such as the NTSC, PAL, or SECAM systems, the systems are standardized to transmit a luminance signal and two color difference signals (I-signal and Q-signal in the NTSC system, and (R-Y) signal and (B-Y) signal in the PAL system). The white is obtained when the two color difference signals are zero, and the color television camera for home use comprises a circuit for generating the above color difference signals.

When picking up an image of an entirely white object by the television camera, the color difference signals are zero when the white adjustment matches with the color of the illumination light source, and the output of the above color difference signal generating circuit deviates towards the positive or negative side when the white adjustment does not match with the color of the illumination source. To adjust this deviation towards the positive or negative side to zero, the primary color signal from the light component of any of the two primary colors of the three primary colors red (R), green (G), or blue (B) can be increased or decreased.

In the circuit for generating the color difference signals (R-Y) and (B-Y), for example, the amplification rate of the primary color signals of R and B can be gradually decreased when the generated output signal increases towards the positive side. On the other hand, the amplification rate of the primary color signals of R and B (hereinafter simply referred as R-signal and B-signal) can be gradually increased, when the generated output signal increases towards the negative side. The (R-Y) and R-signals, and the (B-Y) and B-signals, respectively, do not completely coincide with each other, however, since the R-signal contributes most to the (R-Y) signal and the B-signal contributes most to the (B-Y) signal, the levels of the primary color signals of R and B can be adjusted accordingly, to respectively adjust the two color difference signals (R-Y) and (B-Y) to zero.

However, upon actual operation, there is no problem when an entirely white surface exists under the illumination light source, but outdoors, in most cases, a white plate which is used as an object of an entirely white surface is not on hand. When a scenery having each color in a balanced manner is picked up by a television camera in this case, color difference signals comprising the positive or negative deviation obtained from the color difference signal generating circuit of the television camera, appear about the color difference signal obtained upon picking up of a white plate under that particular illumination light source. In most cases, the average value of the above color difference signals may be considered as being equal to the color difference signal obtained upon picking up the image of the white plate under that illumination light source.

There also are times when the white surface is too small for enlargement to the full scale of the image pick up field of vision, and in this case, it is convenient to use the color difference signal corresponding to one portion of the picture, such as the central portion of the picture.

Accordingly, in a U.S. Patent Application Ser. No. 183,392 filed Sept. 2, 1980, entitled "AUTOMATIC WHITE ADJUSTING CIRCUIT FOR A TELEVISION CAMERA" in which the assignee is the same as that of the present application, a circuit was proposed which is capable of simply performing white adjustment. In this previously proposed circuit, average values of the color difference signals are obtained by the use of a lowpass filter for the partial or entire duration of the picture of the two color difference signals, to adjust the television camera so that it considers the color of the light source as white, and compares the average values with a reference level (zero color difference signal level) which is equal to two color difference signal levels obtained from a color difference signal generating circuit upon picking up an image of an entirely white surface, so as to adjust the average values of the color difference signals to the above reference level by independently increasing or decreasing each of the two color difference signal levels. For the white adjustment, the output signal of the circuit which compares the above average values of the color difference signals with the reference level, is used to generate control voltages for variable gain amplifiers respectively provided in two primary color signal transmitting systems. The control voltages are fixed to the levels when the average values of the color difference signals assume the same level as the above reference level.

Furthermore, in the above proposed automatic white adjusting circuit, two reversible counters are used as control voltage generating devices, to convert the total output (parallel bits) of these reversible counters from digital to analog form, in order to obtain the above control voltages. The control volages are increased or decreased according to the addition (count-up) or subtraction (count-down) performed by the reversible counters, according to the result of the comparison performed between the above color difference signals and the reference level. The above reversible counters alternately repeat a one-count addition and a one-count subtraction, when the average values of the two color difference signals approach the reference level, to generate control voltages which oscillate above and below the most suitable control voltage, and fix (hold) the level of the control voltages by stopping the counting operation of the reversible counters. According to this proposed automatic white adjusting circuit, the cost as well as the size of the circuit are reduced.

However, in the above previously proposed circuit, the difference between the most suitable control voltage and the values of the control voltages which oscillate above and below the most suitable control voltage must be small so that problems are not introduced from the practical point of view. Accordingly, when the number of bits in the above reversible counters are small, the control voltages respectively reach the two values above and below the most suitable control voltage, which are closest to the most suitable control voltage, within a short period of time. However, white adjustment of high quality cannot be performed in this case. On the other hand, when the number of bits in the above reversible counters are large, white adjustment of high quality can be performed, however, it takes longer time for the control voltages to respectively reach the two values above and below the most suitable control voltage, which are closest to the most suitable control voltage.

Therefore, in a case where the above reversible counters are respectively constructed from two four-bit counters, the difference between the most suitable control voltage and the values of the control voltages which oscillate above and below the most suitable control voltage, becomes practically negligible. However, when a pulse of 60 Hz (50 Hz in the case of the PAL, or SECAM system) which is synchronized with the vertical deflection pulse, is used as the clock pulse, the maximum time for the control voltages to reach above and below the closest values with respect to the most suitable control voltage, becomes $1/60 \times (2^3 - 1) = 4.25$ seconds. In addition, the operator of the television camera must continue to operate a switch and the like for operating the counting operation of the reversible counters, until the counting operation of the reversible counters are stopped and the control voltages are fixed (held constant). Hence, in this proposed system, there was a problem in that the television camera became quite troublesome to operate.

SUMMARY OF THE INVENTION

Accordingly, a general object of the present invention is to provide a novel and useful automatic white adjusting circuit for a television camera in which the above described problems have been overcome.

Another and more specific object of the present invention is to provide an automatic white adjusting circuit for a television camera in which a rough adjustment is first performed with an adjustment quantity of large steps, and fine adjustment is secondly performed with an adjustment quantity of small steps, upon automatic adjustment of the white by performing such simple operations are directing the television camera towards a white surface. According to the automatic white adjusting circuit of the present invention, the adjusting accuracy of the white balance can be improved, and the white adjustment can be performed automatically within a short period of time.

Other objects and further features of the present invention will be apparent from the following detailed description when read in conjunction with the accompanying drawings.

BRIEF DESCRIPTION OF THE DRAWINGS

FIGS. 2(A) through 2(C) are diagrams respectively showing signal waveforms at the essential part of the circuit shown in FIG. 1;

DETAILED DESCRIPTION

Figure 1:
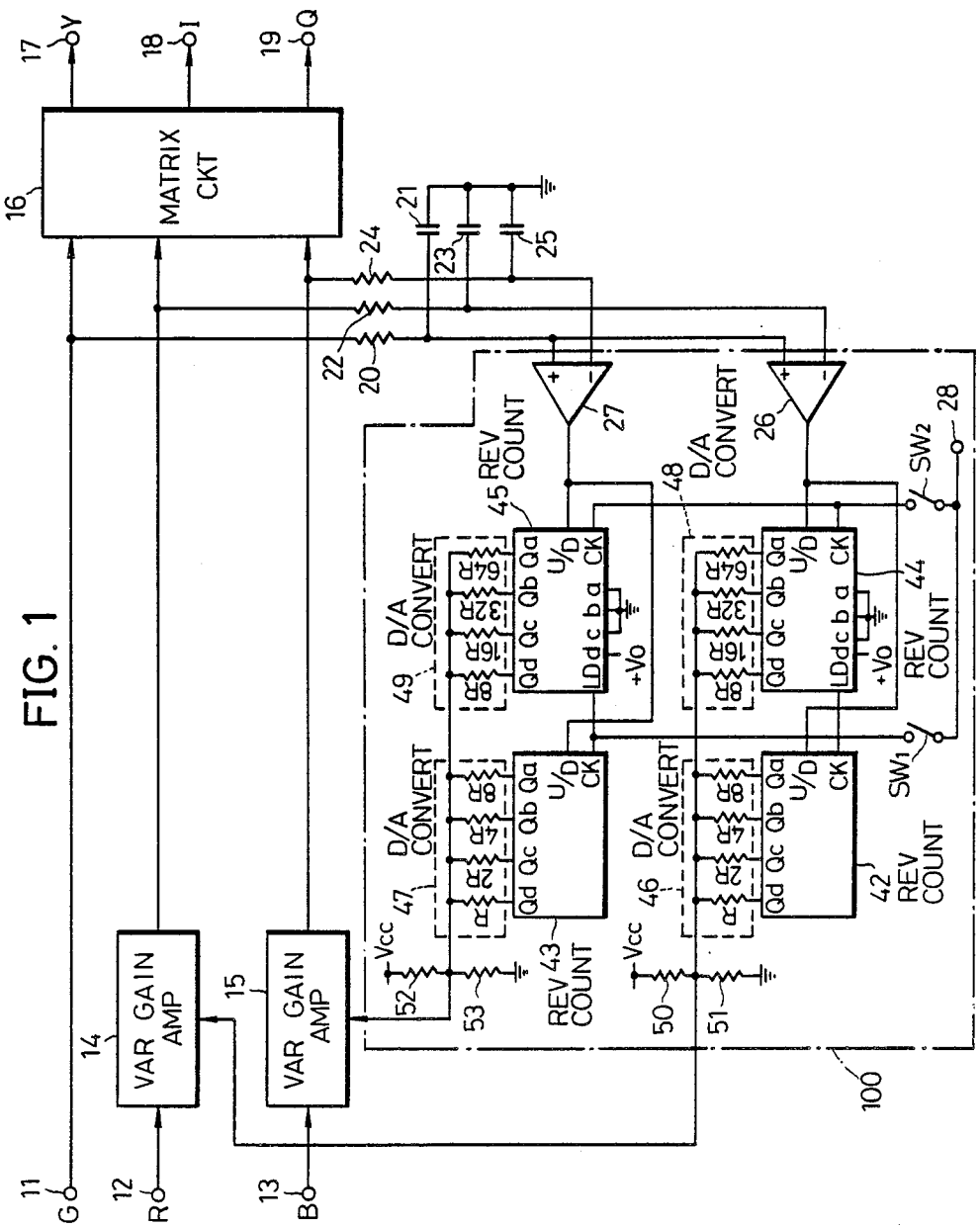
FIG. 1 is a systematic circuit diagram showing a first embodiment of an automatic white adjusting circuit according to the present invention.

FIG. 1 is a systematic circuit diagram showing a first embodiment of an automatic white adjusting circuit according to the present invention. In FIG. 1, green (G), red (R), and blue (B) signals of the three primary color signals which are obtained from the output signal of an image pick-up tube within a television camera, are respectively applied to input terminals 11, 12, and 13. The incoming R-signal to the input terminal 12 is supplied to a variable gain amplifier 14, wherein the level of the signal adjusted according to a first control voltage which will be described hereinafter. Similarly, the incoming B-signal to the input terminal 13 is supplied to a variable gain amplifier 15, wherein the level of the signal is adjusted according to a second control voltage which will be described hereinafter. The G-signal obtained through the input terminal 11 and the R-signal and B-signal obtained through the above variable gain amplifiers 14 and 15, are respectively supplied to a matrix circuit 16. A luminance signal Y, and color difference signals I and Q, are respectively produced from the matrix circuit 16 through output terminals 17, 18, and 19.

The G-signal obtained through the input terminal 11 is also supplied to a low-pass filter comprising a resistor 20 and a capacitor 21, and an average value (DC level) obtained at this low-pass filter is supplied to each non-inverting input terminals of comparators 26 and 27. On the other hand, the output R-signal of the variable gain amplifier 14 is supplied to a low-pass filter comprising a resistor 22 and a capacitor 23, and an average value (DC level) obtained at this low-pass filter is supplied to an inverting input terminal of the comparator 26. Similarly, the output B-signal of the variable gain amplifier 15 is supplied to a low-pass filter comprising a resistor 24 and a capacitor 25, and an average value (DC level) obtained at this low-pass filter is supplied to an inverting input terminal of the comparator 27. Accordingly, the comparators 26 and 27 respectively consider the average value output of the G-signal as the reference level, and respectively produce low-level outputs when the average values of the R-signal and the B-signal respectively are higher than the reference level, and respectively produce high-level outputs when the average values of these R-signal and the B-signal respectively are lower than the reference level. The low-level or high-level outputs of the above comparators 26 and 27 are respectively supplied to up/down input terminals U/D of reversible counters 44 and 45.

In FIG. 1, each of reversible counters 42, 43, 44, and 45 has four-bit parallel output terminals. Output terminals $Q_a$, $Q_b$, $Q_c$ and $Q_d$ of the reversible counter 42 are respectively commonly connected to a connection point between resistors 50 and 51 which construct a reference gain establishing circuit, through weighting resistors respectively having resistance of 8R, 4R, 2R, and R. On the other hand, output terminals $Q_a$, $Q_b$, $Q_c$, and $Q_d$ of the reversible counter 43 are respectively commonly connected to a connection point between resistors 52 and 53 which construct a reference gain establishing circuit, through weighting resistors respectively having resistances of 8R, 4R, 2R, and R. The above circuits comprising the weighting resistors, which are connected to the output side of the reversible counters 42 and 43, respectively construct digital-to-analog (D/A) converters 46 and 47.

Each output terminals $Q_a$, $Q_b$, $Q_c$, and $Q_d$ of the reversible counters 44 and 45 are respectively connected to the above described connection point between the resistors 50 and 51, and the connection point between the resistors 52 and 53, through respective digital-to-analog (D/A) converters 48 and 49 respectively comprising weighting resistors having resistances of 64R, 32R, 16R, and 8R. One terminal of a switch SW1 is connected to clock pulse input terminals CK of the reversible counters 42 and 43, and to load terminals LD of the reversible counters 44 and 45. On the other hand, one terminal of a switch SW2 is connected to clock pulse input terminals CK of the reversible counters 44 and 45. These switches SW1 and SW2 are opening-and-closing switches which respectively pass or interrupt the incoming clock pulse obtained through an input terminal 28.

Preset input terminals a through c of the above reversible counters 44 and 45 are respectively grounded, and preset input terminals d of these reversible counters 44 and 45 are respectively applied with a DC voltage $+V_o$. Accordingly, when a signal is applied to the load terminal LD of the reversible counters 44 and 45, a number "8" is established in binary code within the reversible counters 44 and 45. Further more, an output terminal of the comparator 26 is connected to up/down input terminals U/D of the reversible counters 42 and 44, while an output terminal of the comparator 27 is connected to up/down input terminals U/D of the reversible counters 43 and 45.

In the circuit shown in FIG. 1 having the above described construction, when only the switch SW1 is closed, the clock pulse introduced through the input terminal 28 is supplied to the clock pulse input terminals CK of the reversible counters 42 and 43 through the above switch SW1. Therefore, the reversible counters 42 and 43 respectively perform addition counting operation or subtraction counting operation according to the respective signal supplied from the comparators 26 and 27. The counted output of these reversible counters 42 and 43 are subjected to digital-to-analog (D/A) conversion at the D/A converters 46 and 47. These converted signals from the D/A converters 46 and 47 are respectively supplied to the variable gain amplifiers 14 and 15 as gain varying control voltages, through the reference gain establishing circuits respectively comprising the resistors 50 and 51, and resistors 52 and 53. An example of the above gain varying control voltage is shown by a solid line III in FIG. 2(A). As clearly seen from FIG. 2(A), the voltage per step of the gain varying control voltage is large, and thus, the time for the control voltage to reach the most suitable control voltage shown by a two-dot chain line V from the initial voltage shown by a one-dot chain line IV, which time is indicated by $T_3$, is short. Hence, the gain varying control voltage reaches the above most suitable control voltage, and thereafter rises and falls repeatedly by one step above and below the most suitable control voltage, to enter into a converging state.

When the switch SW1 is then opened, and the switch SW2 is closed in a state where the gain varying control voltages are in converging states, the counting operation of the reversible counters 42 and 43 are stopped. Moreover, the clock pulse from the input terminal 28 is supplied to the clock pulse input terminals CK of the reversible counters 44 and 45 through the above switch SW2. Further, voltages corresponding to the remaining quantity of the difference between the control voltages obtained as a result of the counting operation performed by the reversible counters 42 and 43 and the most suitable control voltage, are applied to respective up/down input terminals U/D of the reversible counters 44 and 45. Accordingly, the reversible counters 44 and 45 start to perform an addition counting operation or a subtraction counting operation according to the above applied voltages. The counted outputs of the reversible counters 44 and 45 thus obtained, are respectively supplied to the variable gain amplifiers 14 and 15 as gain varying control voltages, through the D/A converters 48 and 49 which are constructed to obtain voltages of step forms in which the voltage per step is smaller than in the D/A converters 46 and 47.

In the example shown in FIG. 2(A), the gain varying control voltages obtained through the D/A converters 48 and 49 respectively reach values which are closest to the most suitable control voltage shown by the two-dot chain line V, within a time $T_4$ from the closing of the switch SW2. In addition, these gain varying control voltages thus obtained oscillate above and below the most suitable control voltage, to enter into converging states thereafter. When the switch SW2 is opened in the above state where the control voltages are in converging states, the counting operation of the reversible counters 44 and 45 are stopped, and the gain varying control voltages become fixed at those particular voltages closest to the most suitable control voltage. FIG. 2(B) shows the waveform of the clock pulse applied to the reversible counters 42 and 43, and FIG. 2(C) shows the waveform of the clock pulse applied to the reversible counters 44 and 45.

In order to perform fine adjustment with respect to the remaining difference described above by the counting operation of the reversible counters 44 and 45, the varying quantity per count of the control voltage by the output obtained by digital-to-analog converted counted value must be smaller than the varying quantity per count of the control voltage by the output obtained by digital-to-analog converted counted value converted by the D/A converters 46 and 47. However, the fine adjusting operation does not converge, if the total varying quantity of all the steps are not larger than the maximum value of the above remaining difference. Further, since the reversible counters 44 and 45 respectively perform addition counting operation or subtraction counting operation according to the polarity of the remaining difference with respect to the most suitable control voltage, in order for the fine adjusting operation to converge in either of of the above two cases, the initial counted values of the reversible counters 44 and 45 upon starting of the counting operation must be preset to values substantially half the counted values which can be obtained, and the control voltage varying quantity due to the output varying quantity of the D/A converters 48 and 49 obtained from each varying quantity from the preset counted value to the maximum or minimum counted values must be larger than the above remaining difference quantity.

When the initial counted values of the reversible counters 44 and 45 are not preset to substantially half the counted values which can be obtained, and present to values inclined towards one side, the adjusting range of the gain varying control voltage becomes large on one side where the control voltage rises or falls, however, the adjusting range of the gain varying control voltage becomes small on the other side where the control voltage falls or rises. This situation is not preferable. Accordingly, in the present embodiment of the invention, the switch SW1 is closed as described above, to apply a load pulse to the respective load terminals LD of the reversible counters 44 and 45, and thus, a counted value of "8" in binary code is preset into the reversible counters 44 and 45.

Figure 3A:
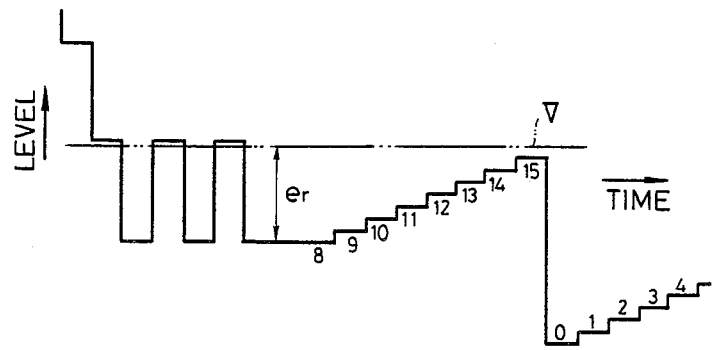
FIGS. 3A, 3B, 4A, and 4B are diagrams respectively showing control voltage waveforms, for explaining the selecting method of the control voltage which varies according to the counted value of the reversible counter used for fine adjustment in the circuit of the present invention.
Figure 3B:
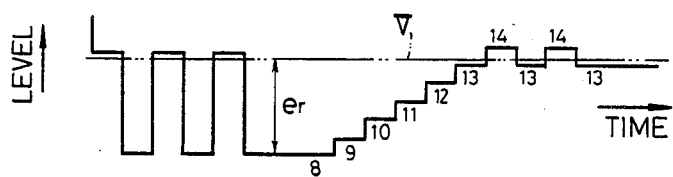

FIG. 3A shows the variation in the gain varying control voltage in a case where the remaining difference $e_r$ cannot be covered, since the varying quantity of the control voltage is exceedingly small per step, although the preset value is "8" in the reversible counters 44 and 45. In this particular case, even when the counted value reaches the maximum counted value of "15" in binary code, the fine adjusting operation does not converge, since the above gain varying control voltage does not exceed the most suitable control voltage shown by the two-dot chain line V in FIG. 3A. On the other hand, FIG. 3B shows a case where the preset counted value in the reversible counters 44 and 45 respectively are "8" in binary code, and the varying quantity of the gain varying control voltage is suitable value per step, that is, the variation in the control voltage in a case where the remaining difference $e_r$ can be covered. In this case, the counted value becomes "13" and "14" alternately and repeatedly in binary code, and the fine adjusting operation converges as shown in FIG. 3B.

Figure 4A:
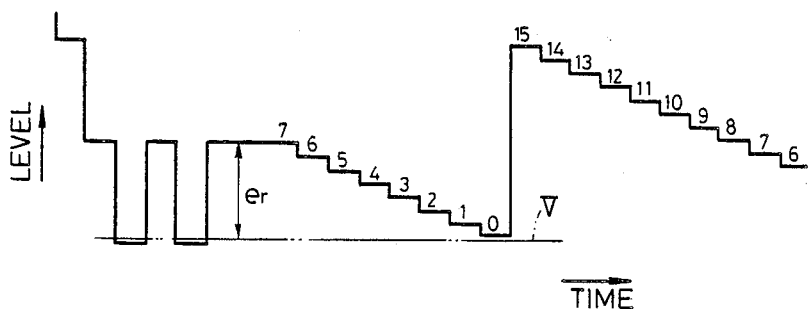
Figure 4B:
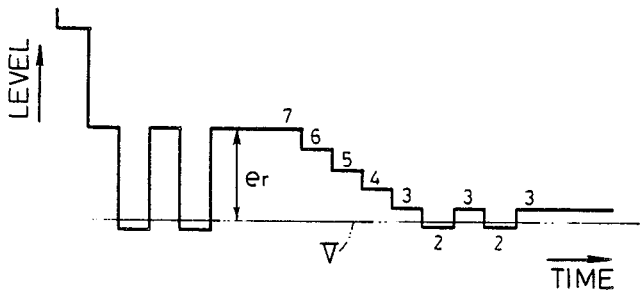

However, the preset values in the reversible counters 44 and 45 can be "7" in binary code, and the variation in the gain varying control voltage in a case where the remaining difference $e_r$ cannot be covered and in a case where the remaining difference $e_r$ can be covered under this preset value, are respectively shown in FIGS. 4A and 4B.

As described above, in the present embodiment of the invention, rough white adjustment is performed by use of the reversible counters 42 and 43, and fine adjustment is performed by use of the reversible counters 44 and 45. In addition, the maximum remaining difference due to rough adjustment is covered by a quantity which is half the total varying quantity of the control voltage used for fine adjustment, so that the fine adjusting operation converges as shown in FIGS. 3B and 4B. Accordingly, the control adjusting accuracy (resolving power) obtained by use of the reversible counter 42 (43) for rough adjustment and the reversible counter 44 (45) for fine adjustment, decreases by one bit compared to the case where all the bits of the reversible counters 42 (43) and 44 (45) are used to perform the adjusting operation. That is, when a reversible counter having an eight-bit parallel output is constructed from four-bit reversible counters, a resolving power of 256 ($=2^8$) is obtained.

however, in the case where the reversible counters 42 (43) and 44 (45) respectively are four-bit counters in the present embodiment of the invention, the resolving power obtained is 128 ($=2^7$).

However, the circuit in the present embodiment of the invention is advantageous in that the time required until the white adjustment is completed is exceedingly short compared to the conventional circuits. The reversible counters 42 and 43 of the reversible counters 42 through 46 are used for rough adjustment, and the maximum time $T_{3max}$ (indicated by $T_3$ in FIG. 2(A)) required to perform the rough adjustment becomes as follows, when it is assumed that the repetitive frequency of the clock pulse is set to 60 Hz which is synchronized with the vertical driving pulse.

$$T_{3max} = 1/60 \cdot (2^4 - 1) = 0.25 \text{ (seconds)}$$

Further, the maximum time $T_{4max}$ (indicated by $T_4$ in FIG. 2(A)) required to perform the fine adjustment by use of the reversible counters 44 and 45 becomes as follows.

$$T_{4max} = 1/60 \cdot 2^4/2 = 0.13 \text{ (seconds)}$$

Therefore, according to the present embodiment of the invention, white adjustment can be completed with approximately 0.4 seconds, which is the total time obtained by adding the above maximum times $T_{3max}$ and $T_{4max}$.

In contrast, in order to obtain the same resolving power as in the present embodiment of the invention in the conventional circuit, a reversible counter of seven bits must be used. In this case, the control voltage varies as shown by a dotted line VI in FIG. 2. Accordingly, the maximum time $T_{5max}$ of the time $T_5$ required until the adjusting operation converges becomes as shown below.

$$T_{5max} = 1/60 \cdot (2^7 - 1) = 2.1 \text{ (seconds)}$$

Upon actual operation of the television camera, the operator must operate the switch which operates the counting operation of the reversible counter, for a longer time period than the convergence time calculated above. Hence, a convergence time of 2.1 seconds is quite long, and becomes a problem upon operation. However, in the present embodiment of the invention, no problems are introduced upon operation, since the convergence time is a short time period of 0.4 seconds.

Figure 5:
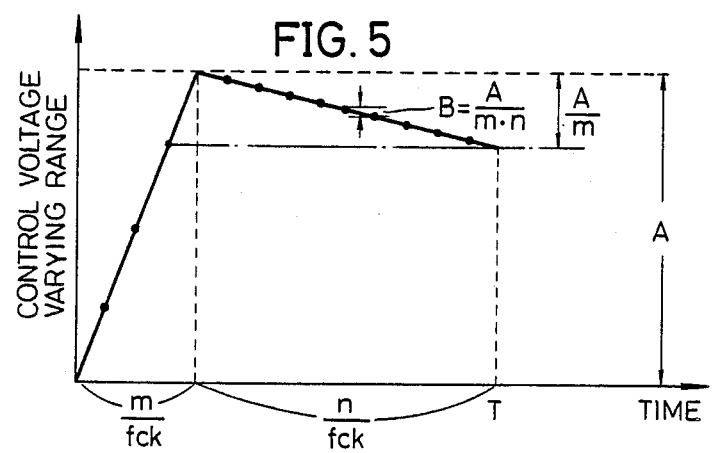
FIG. 5 is a characteristic diagram for explaining the condition for the minimum time required for white adjustment in the circuit of the present invention.

In order to minimize the time (convergence time) required for the control voltage to oscillator above and below the most suitable control voltage, from the time the adjusting operation is started, it is desirable to set the number of bits (bit distribution) of the reversible counters 42 and 43 and the reversible counters 44 and 45 substantially equal. The reason for the above, will now be described in conjunction with FIG. 5. FIG. 5 shows a graph for obtaining the condition for setting the convergence time to a minimum value. When the total number of steps in the control voltage for rough adjustment is designated by m (m is an integer), and the total number of steps in the control voltage for fine adjustment is designated by n (n is an integer), the control voltage varying width B corresponding to the minimum resolving power with respect to the maximum control voltage varying width A becomes $B = A/(m \cdot n)$. Accordingly, $A/B = m \cdot n$, and the maximum convergence time T under a specific condition can thus be described by the following equation, where $f_{ck}$ is the clock pulse frequency.

$$T = 1/f_{ck}(m + n)$$

When the condition for setting the above maximum convergence time T to a minimum value is obtained, the following equations are obtained.

$$\frac{\delta T}{\delta m} = \frac{1}{f_{ck}} \left( 1 - \frac{A}{B} \cdot \frac{1}{m^2} \right) = 0$$

$$m = \sqrt{\frac{A}{B}} = \sqrt{m \cdot n}$$

or $m = n$

As obvious from the above equations, the above maximum convergence time T becomes minimum, when the total number of steps m in the control voltage for rough adjustment and the total number of steps n in the control voltage for fine adjustment are equal to each other. In this case, the value $(m+n)$ which is the sum of the total number of steps m and n becomes minimum, and the total number of bits required also becomes minimum.

Therefore, when obtaining the same accuracy, the best efficiency is obtained in view of the number of bits in the reversible counters, and in view of the convergence time, by setting the total number of steps m of the control voltage for rough adjustment equal to the total number of steps n of the control voltage for fine adjustment which covers the maximum remaining difference. It is obvious, however, that it is most desirable to establish a condition as close to the above condition as possible, even when a counter of the integrated circuit (IC) type is used or when the above condition cannot be fully met.

Figure 6:
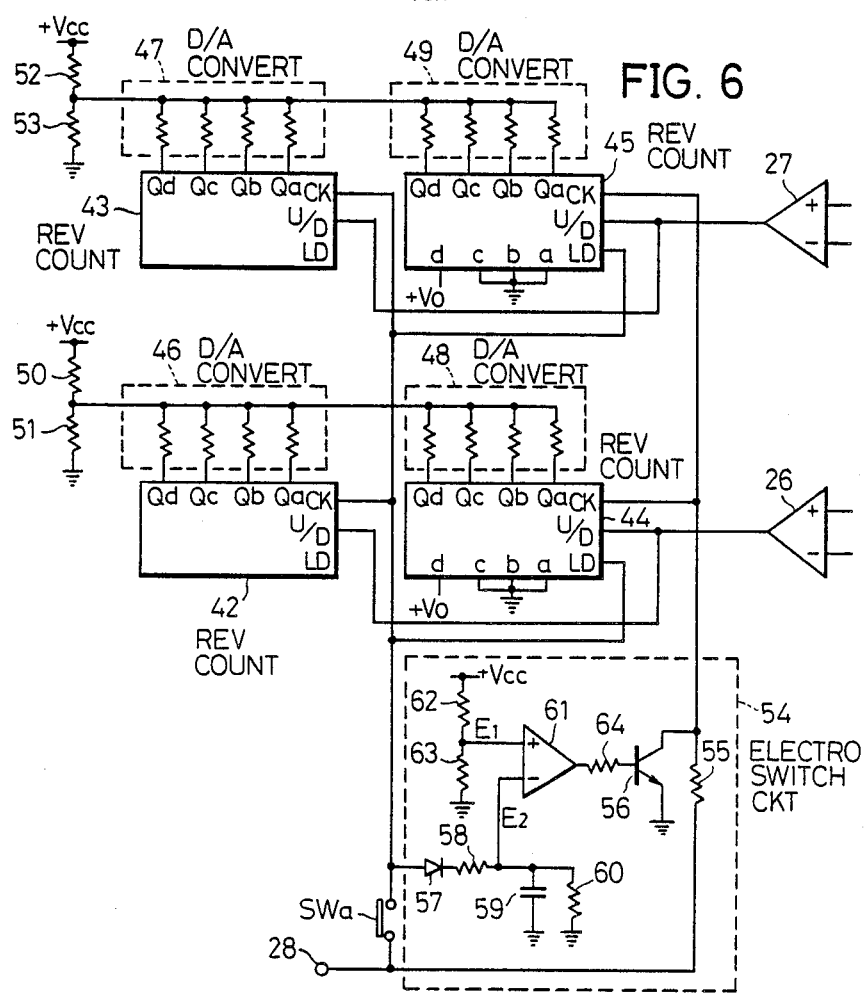
FIG. 6 is a concrete circuit diagram showing an essential part of a second embodiment of an automatic white adjusting circuit according to the present invention.

Next, a second embodiment of an automatic white adjusting circuit according to the present invention will be described in conjunction with FIGS. 6 and 7(A) through 7(D). FIG. 6 shows an essential part of the second embodiment of the circuit according to the present invention, and those parts which are the same as those corresponding parts in FIG. 1 will be designated by like reference numerals, and their description will be omitted.

In the present embodiment of the invention, two pairs of reversible counters provided, are each divided into reversible counters for rough adjustment and reversible counters for fine adjustment. The clock pulse is applied to the reversible counters for rough adjustment, and the respectively control voltages of the step form thus obtained are respectively converged to the two values closest to the most suitable control voltage above and below the most suitable control voltage, within a short period of time. Then, the clock pulse is changed over and applied to the reversible counters for fine adjustment, and fine adjustment is performed so that the control voltages having small steps thus obtained, respectively converge to the two values closest to the above most suitable control voltage above and below the most suitable control voltage, within a short period of time. These adjusting operations are identical to those performed in the above first embodiment of the invention. Hence, the clock pulse must be applied to the reversible counters for rough adjustment and the reversible counters for fine adjustment in a time series manner, as in the above first embodiment of the invention. In the first embodiment of the invention, two switches, namely, the switches SW1 and SW2, were provided to change over the clock pulse applied to the reversible counters in a time series manner. However, in the present embodiment of the invention, only a single switch SWa is used as shown in FIG. 6.

The switch SWa in FIG. 6 is a commonly used automatic return type opening-and-closing type switch. One terminal of the switch SWa is connected to the input terminal 28, and to the collector of a switching transistor 56 through a resistor 55 within an electronic switching circuit 54 which has a function similar to the switch SW2 in FIG. 1. On the other hand, the other terminal of the switch SWa is connected to a non-grounded terminal of a capacitor 59 through a series connection of a diode 57 and a resistor 58 which construct a part of the electronic switching circuit 54. Moreover, this other terminal of the switch SWa is also connected to each clock pulse input terminal CK of the reversible counters 42 and 43, and to each load terminal LD of the reversible counters 44 and 45.

A discharging resistor 60 is connected in parallel with the above capacitor 59, and in addition, the connection point between the capacitor 59 and the resistor 58 is connected to an inverting input terminal of a voltage comparator 61. The connection point between resistors 62 and 63 are connected to a non-inverting input terminal of the voltage comparator 61. Accordingly, a reference voltage $E_1$ obtained by voltage-dividing the power source voltage $+V_{cc}$ by use of resistors, is always supplied to the non-inverting input terminal of the voltage comparator 61. Furthermore, the output terminal of the voltage comparator 61 is connected to the base of the above transistor 56 through a resistor 64.

Next, description will be given with respect to the operation of the circuit of the above construction. When the operator of a television camera closes the switch SWa in a state where an image of a white object is picked up in order to first perform white adjustment, upon picking up an image under a new illumination light source, a clock pulse obtained from the input terminal 28 which is synchronized with the vertical driving pulse, is applied to each clock pulse input terminal CK of the reversible counters 42 and 43 for rough adjustment. Moreover, the above clock pulse is applied to each load terminal LD of the reversible counters 44 and 45 for fine adjustment, simultaneously with the application of the clock pulse to the clock pulse input terminals CK of the reversible counters 42 and 43. Accordingly, the reversible counters 42 and 43 for rough adjustment respectively start the counting operation, however, the reversible counters 44 and 45 for fine adjustment respectively are always in a state where the counting operation is stopped, although the clock pulse is supplied to the load terminals LD of these reversible counters 44 and 45.

The clock pulse input terminals CK of the reversible counters 44 and 45 are directly connected to the input terminal 28 through the resistor 55, without being connected through the switch SWa. Thus, the transmission of the clock pulse from the input terminal 28 to the clock pulse input terminals CK of the reversible counters 44 and 45 is interrupted, since the transistor 56 is normally in an ON state. In addition, these reversible counters 44 and 45 do not perform counting operations, since the clock pulse is not applied to the respective clock pulse input terminals CK of the reversible counters 44 and 45. The reversible counters 44 and 45 only perform counting operations when the transistor 56 is in an OFF state, the clock pulse is supplied to the clock pulse input terminals CK of these reversible counters 44 and 45, and the load input voltage is not applied to the load terminals LD of these reversible counters 44 and 45.

Figure 7:
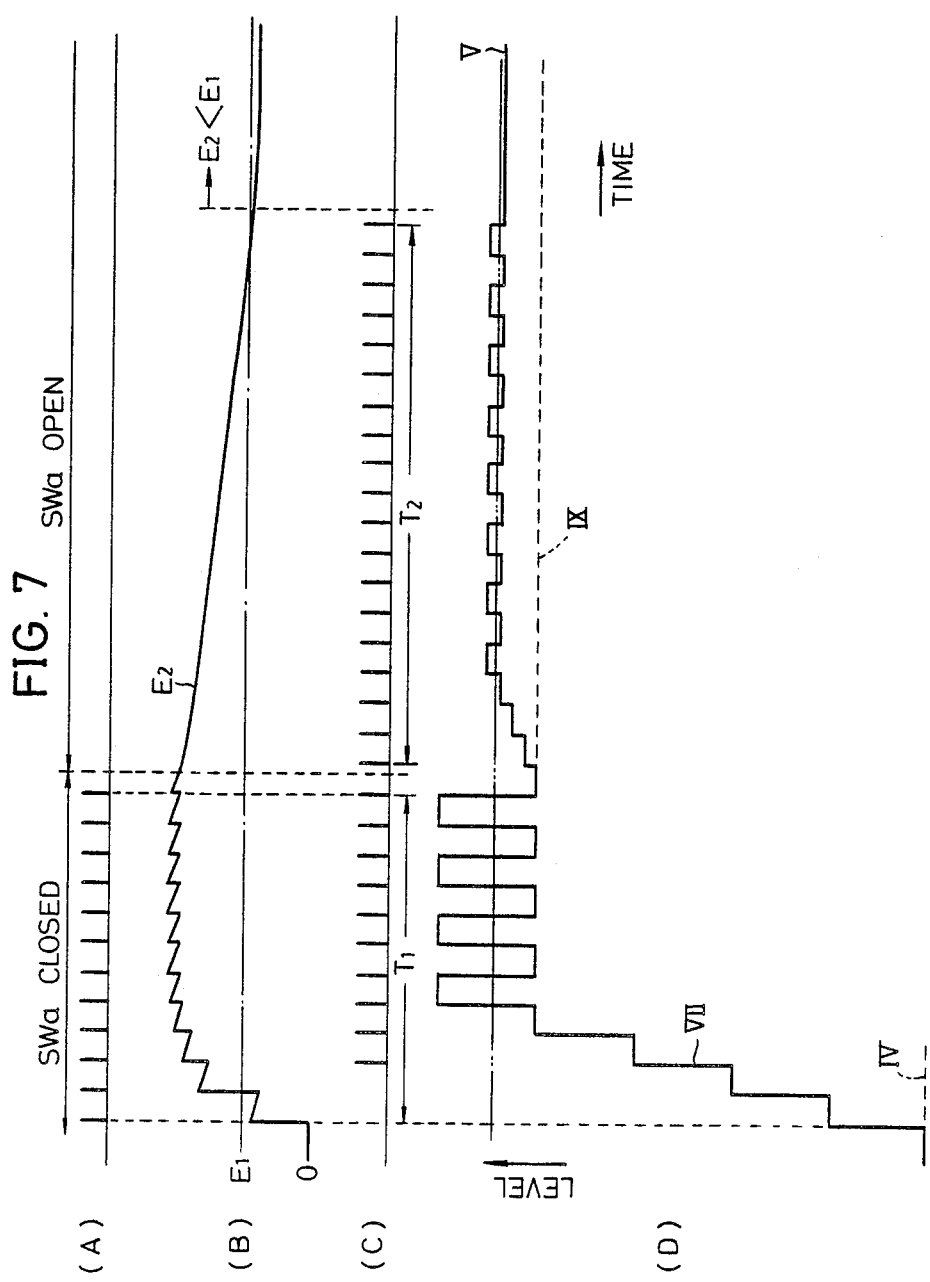
FIGS. 7(A) through 7(D) are diagrams respectively showing signal waveforms at the essential part of the circuit shown in FIG. 6.

Due to the closing of the above switch SWa, the incoming clock pulse from the input terminal 28 obtained through the switch SWa has a waveform as shown in FIG. 7(A). This clock pulse is applied to the capacitor 59 through the series connection of the diode 57 and the resistor 58, to charge the capacitor 59. The diode 57, the resistor 58, the capacitor 59, and the resistor 60 construct a charging and discharging circuit. A voltage $E_2$ between the terminals of the capacitor 59 rises as shown by a solid line in FIG. 7(B), due to the incoming clock pulse obtained through the switch SWa. When this voltage $E_2$ becomes larger than the reference voltage $E_1$ shown by a one-dot chain line in FIG. 7(B), the output of the voltage comparator 61 is varied from high level to low level. Therefore, the transistor 56 is turned OFF, and the clock pulse from the input terminal 28 is supplied to each clock pulse input terminal CK of the reversible counters 44 and 45 through the resistor 55. However, at this point in time, a pulse having the same phase as the clock pulse supplied to the clock pulse input terminals CK is applied to the load terminals LD of these reversible counters 44 and 45, and thus, these reversible counters 44 and 45 do not perform counting operations.

During the period $T_1$ shown in FIG. 7(C) in which the switch SWa is closed, the reversible counters 42 and 43 for rough adjustment respectively perform counting operations. The control voltages supplied to the variable gain amplifiers (not shown in FIG. 6) respectively approach the most suitable control voltage indicated by a two-dot chain line in FIG. 7(D) from the initial value shown by a one-dot chain line IV in step forms, and reach a convergence state wherein the control voltages respectively oscillate at the two values closest to the most suitable control voltage above and below the most suitable control voltage. The time required until this convergence state is obtained in the present embodiment of the invention is approximately 0.3 seconds from when the switch SWa is closed. The waveform of the pulse applied to the clock pulse input terminals CK of the reversible counters 44 and 45, is shown in FIG. 7(C), however, during the time period $T_1$ in which the switch SWa is closed, the above clock pulse is invalid as a clock pulse as described above.

When the switch SWa is opened after the reversible counters 42 and 43 respectively reach convergence states, no clock pulse passes through the switch SWa as shown in FIG. 7(A). Accordingly, the counting operations of the reversible counters 42 and 43 for rough adjustment are stopped, and simultaneously, the input to the load terminals LD of the reversible counters 44 and 45 for fine adjustment are cut off. Therefore, the reversible counters 44 and 45 respectively start to count the incoming pulse supplied from the input terminal 28 through the resistor 55.

The charging time constant of the above charging and discharging circuit is selected to a small value while the discharging time constant is selected to a sufficiently large value, and hence, when the clock pulse applied to the capacitor 59 is cut off, the charged electric charge within the capacitor 59 is discharged through the resistor 60. Therefore, the terminal voltage $E_2$ of the capacitor 59 gradually decreases as shown in FIG. 7(B), and after a sufficient time period has elapsed to allow the reversible counters 44 and 45 to reach convergence states after counting the clock pulse supplied within the above period, the above terminal voltage $E_2$ becomes smaller than the reference voltage $E_1$ obtained from the connection point between the resistors 62 and 63. Accordingly, the output of the voltage comparator 61 becomes of high level, and the transistor 56 is turned ON. Furthermore, the application of the clock pulse to the reversible counters 44 and 45 is stopped by the transistor 56. The interval shown by $T_2$ in FIG. 7(C) indicates the effective clock pulse applying interval in which the clock pulse is applied to the reversible counters 44 and 45, within the time period until when the terminal voltage $E_2$ of the above capacitor 59 becomes smaller than the reference voltage $E_1$.

When the supply of the clock pulse to the reversible counters 44 and 45 is stopped due to the turning ON of the transistor 56, the counting operations of the reversible counters 44 and 45 are respectively stopped. Hence, the respective control voltage for fine adjustment of the reversible counters 44 and 45, becomes fixed at either one of the two values closest to the most suitable control voltage shown by the two-dot chain line in FIG. 7(D), above or below the most suitable control voltage. The above control voltage is fixed to one of the two values above or below the most suitable control voltage according to the counted values of the reversible counters 44 and 45 upon stopping of the counting operations. Accordingly, the automatic white adjustment is thus completed.

FIG. 7(D) shows the control voltage waveform which is subjected to digital-to-analog conversion, and in a case where the above described fine adjustment is not performed as in the circuit according to the present invention, the control voltages are respectively fixed to a value shown by a dotted line IX, for example. However, it is clearly seen from FIG. 7(D) that the control voltages can respectively be fixed to values which have smaller remaining differences from the most suitable control voltage, when a circuit according to the present embodiment of the invention is used.

In the above described embodiments of the invention, the white adjustment was performed so that the average values of the R-signal and the B-signal become equal to the average value of the G-signal, on the basis that the rate of variation in the G-signal with respect to the charge in the color temperature of the illumination light source is the smallest of the three primary color signals. However, the white adjustment can also be performed by use of a white detection signal which indicates the deviation from the white obtained, on the basis that two color difference signals, produced from the remaining primary color signal excluding the two primary color signals which pass through the variable gain amplifiers or the luminance signal and the above two primary color signals, respectively become zero when picking up the image of a white object. Description will now be given with respect to embodiments using such principle.

Figure 8:
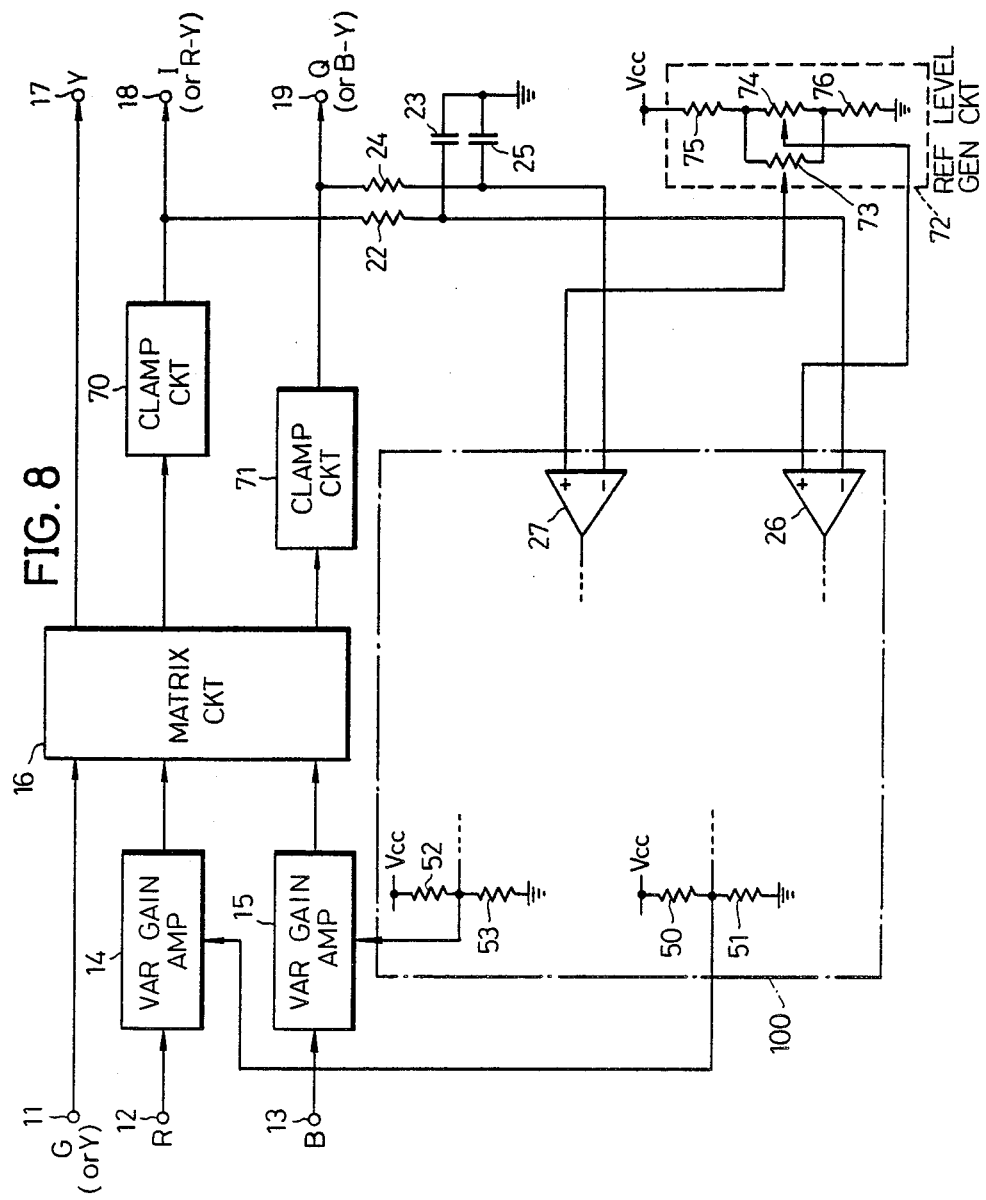
FIG. 8 is a systematic block diagram showing a third embodiment of an automatic white adjusting circuit according to the present invention.

A third embodiment of an automatic white adjusting circuit according to the present invention is shown in FIG. 8. In FIG. 8, those parts which are the same as those corresponding parts in FIG. 1 are designated by the same reference numerals, and their description will be omitted. A circuit part 100 enclosed by a one-dot chain line in FIG. 8 is the same as a circuit part 100 shown in FIG. 1, and full illustration of the circuit within the circuit part 100 is omitted in FIG. 8. In the present embodiment of the invention, the signal applied to the terminal 11 may be the luminance signal within the output signal of the image pickup tube, instead of the G signal. Description will hereinafter be given for the case where the luminance signal is supplied to the terminal 11.

The luminance signal from the terminal 11 and the R and B signals from the variable gain amplifiers 14 and 15 are supplied to the matrix circuit 16. Color difference signals R-Y and B-Y produced at the matrix circuit 17 are supplied to respective clamping circuits 70 and 71 where the color difference signals are clamped to respective reference levels at the blanking periods. An output signal of the clamping circuit 70 is supplied to the lowpass filter comprising the resistor 22 and the capacitor 23. On the other hand, an output signal of the clamping circuit 71 is supplied to the lowpass filter comprising the resistor 24 and the capacitor 25. Unlike in the first embodiment described before, the lowpass filter comprising the resistor 20 and the capacitor 21 is not provided in present embodiment. Instead, a reference level generating circuit 72 is provided for supplying reference levels to the respective non-inverting input terminals of the comparators 26 and 27. These reference levels are substantially equal to the clamping reference levels for the color difference signals R-Y and B-Y.

The circuit 72 comprises potentiometers 73 and 74, and resistors 75 and 76. Hence, coupled with the high gain of the comparators 26 and 27, the output signal levels of the comparators 26 and 27 become low when the average values of the color difference signals R-Y and B-Y are higher than the respective reference levels. On the other hand, the output signal levels of the comparators 26 and 27 become high when the average values of the color difference signals R-Y and B-Y are lower than the respective reference levels. The first and second control voltages supplied to the variable gain amplifiers 14 and 15, are thus obtained from the outputs of the comparators 26 and 27 through signal processing similar to that described with respect to the first embodiment.

Figure 9:
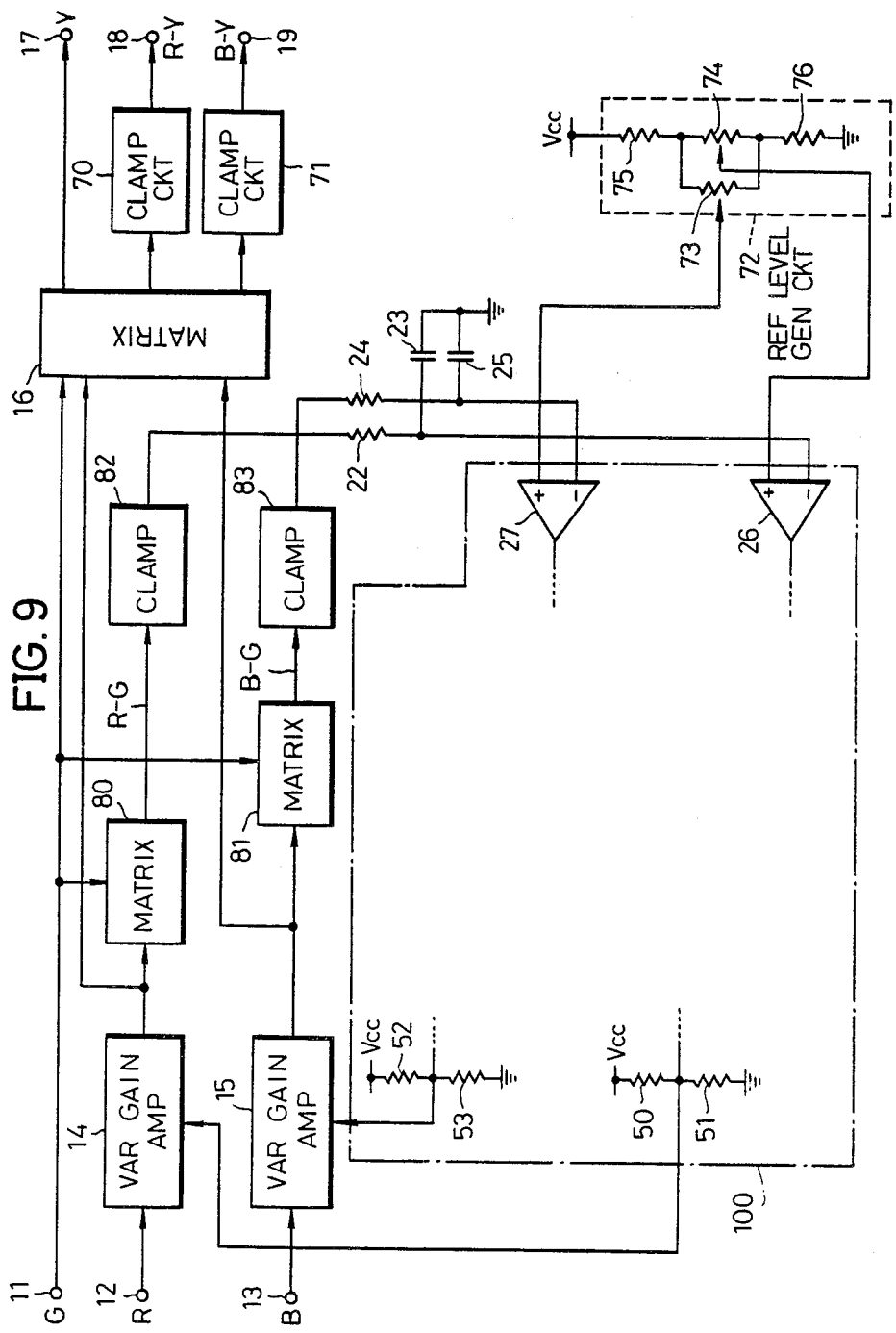
FIG. 9 is a systematic block diagram showing a fourth embodiment of an automatic white adjusting circuit according to the present invention.

A fourth embodiment of an automatic white adjusting circuit according to the present invention is shown in FIG. 9. In FIG. 9, those parts which are the same as those corresponding parts in FIGS. 1 and 8 are designated by the same reference numerals, and their description will be omitted. As done in FIG. 8, details of the construction of the circuit part 100 is omitted in FIG. 9.

In the present embodiment, the G signal applied to the terminal 11, is supplied to matrix circuits 80, 81, and 16. The output R signal of the variable gain amplifier 14 is supplied to the matrix circuits 80 and 16. On the other hand, the output B signal of the variable gain amplifier 15 is supplied to the matrix circuits 81 and 16. As a result, the matrix circuit 80 produces a color difference signal R-G, while the matrix circuit 81 produces a color difference signal B-G. The color difference signals R-G and B-G are respectively supplied to clamping circuits 82 and 83 where the color difference signals are clamped to respective reference levels at the blanking periods.

Similarly as in the third embodiment described before, the matrix circuit 16 produces the luminance signal Y and produces this signal Y through the terminal 17.

The color difference signals R-Y and B-Y respectively produced in the matrix circuit 16, are delivered from the terminals 18 and 19, through the respective clamping circuits 70 and 71.

The output color difference signal from the clamping circuit 82 is supplied to the lowpass filter comprising the resistor 22 and the capacitor 23, and then applied to the inverting input terminal of the comparator 26. Similarly, the output color difference signal from the clamping circuit 83 is supplied to the lowpass filter comprising the resistor 24 and the capacitor 25, and then applied to the inverting input terminal of the comparator 27. The reference level generating circuit 72 supplies reference levels to the respective non-inverting input terminals of the comparators 26 and 27. These reference levels are substantially equal to the clamping reference levels for the color difference signals R-G and B-G.

Accordingly, the output signal levels of the comparators 26 and 27 become low when the average values of the color difference signals R-G and B-G are higher than the respective reference levels. On the other hand, the output signal levels of the comparators 26 and 27 become high when the average values of the color difference signals R-G and B-G are lower than the respective reference levels. The first and second control voltages supplied to the variable gain amplifiers 14 and 15, are thus obtained from the outputs of the comparators 26 and 27 through the signal processing similar to that described with respect to the first embodiment.

It should be noted that the circuit part 100 of the third and fourth embodiments can be replaced with the circuit shown in FIG. 6.

In the third and fourth embodiments of the present invention shown in FIGS. 8 and 9, the circuit parts except the circuit part 100 are disclosed in FIGS. 1 and 2 of the aforementioned U.S. patent application Ser. No. 183,392 and also in the U.S. Pat. No. 4,219,841 issued on Aug. 26, 1980 (its corresponding Japanese Patent Application was laid-open on Sept. 13, 1979 as Laid-Open Patent Application No. 54-118132), and are not novel per se.

Moreover, a micro-computer may be used instead of the reversible counters employed in the embodiments described above, to perform the same operations as the reversible counters.

Further, the present invention is not limited to these embodiments, but various variations and modifications may be made without departing from the scope of the present invention.

What is claimed is:

1. An automatic white adjusting circuit for a television camera having a color image pick-up device, said automatic white adjusting circuit comprising:
   first variable gain amplifying means applied with a first primary color signal;
   second variable gain amplifying means applied with a second primary color signal,
   matrixing means applied with a third primary color signal and outputs of said first and second variable gain amplifying means;
   first, second, and third low-pass filters respectively applied with the outputs of said first and second variable gain amplifying means and said third primary color signal;
   first and second comparing means respectivey supplied with an output of said third low-pass filter to a single input terminal, and supplied with respective outputs of said first and second low-pass filters to their respective other input terminal;
   first and third reversible counter means respectivel supplied with an output of said first comparing means to their respective up/down input terminals;
   second and fourth reversible counter means respectively supplied with an output of said second comparing means to their respective up/down input terminals;
   first, second, third and fourth digital-to-analog converters respectively supplied with parallel outputs of said first, second, third, and fourth reversible counter means;
   first reference gain establishing means supplied with outputs of said first and third digital-to-analog converters;
   second reference gain establishing means supplied with outputs of said second and fourth digital-to-analog converters; and
   switching means for selectively switching over an incoming clock pulse, to supply said clock pulse to respective clock pulse input terminals of said first and second reversible counter means or said third and fourth reversible counter means,
   said clock pulse input terminals of said first and second reversible counter means being respectively connected to load terminals of said third and fourth reversible counter means,
   said first and second variable gain amplifying means respectively being supplied with gain varying control voltages from said first and second reference gain establishing means,
   said matrixing means producing a luminance signal and two color difference signals.

2. An automatic white adjusting circuit for a television camera having a color image pick-up device generating an output signal from which first and second primary color signals and an other signal are derived, said other signal being either in a luminance signal or a third primary color signal, said automatic white adjusting circuit comprising:
   first and second variable gain amplifying means for amplifying said first and second primary color signals, respectively;
   matrixing means applied with said other signal and outputs of said first and second variable gain amplifying means, for producing first and second color difference signals;
   first and second lowpass filters respectively applied with said first and second color difference signals;
   means for generating reference levels equal to DC levels of said first and second color difference signals when picking up an image of a white object by said image pick-up device;
   first and second comparing means respectively supplied with said reference levels to a single input terminal, and supplied with respective outputs of said first and second lowpass filters to their respective other input terminal;
   first and third reversible counter means respectively supplied with an output of said first comparing means to their respective up/down input terminals;
   second and fourth reversible counter means respectively supplied with an output of said second comparing means to their respective up/down input terminals;
   switching means for selectively switching over an incoming clock pulse, to supply said clock pulse to respective clock pulse input terminals of said first and second reversible counter means or to respective clock pulse input terminals of said third and fourth reversible counter means;

said clock pulse input terminals of said first and second reversible counter means being respectively connected to load terminals of said third and fourth reversible counter means;

first, second, third, and fourth digital-to-analog converters respectively being supplied with parallel outputs of said first, second, third, and fourth reversible counter means; and first and second reference gain establishing means respectively supplied with outputs of said first and third digital-to-analog converters and outputs of said second and fourth digital-to-analog converters, for respectively producing first and second gain control voltages to be respectively supplied to said first and second variable gain amplifying means.

3. An automatic white adjusting circuit as claimed in claim 2 in which said switching means first supplies said clock pulse to the respective clock pulse input terminals of said first and second reversible counter means and the respective load terminals of said third and fourth reversible counter means until said first and second reversible counter means respectively reach convergence states, and secondly cuts off said supply of said clock pulse to switch over said supply of said clock pulse to the respective clock pulse input terminals of said third and fourth reversible counter means until said third and fourth reversible counter means respectively reach convergence states, and cut off the latter supply of said clock pulse when said third and fourth reversible counters respectively reach said convergence states.

4. An automatic white adjusting circuit as claimed in claim 3 in which number of bits in said first, second, third, and fourth reversible counter means are substantially equal to each other, and initial counted values of said third and fourth reversible counter means are preset to values substantially half the maximum counted values which can be respectively obtained.

5. An automatic white adjusting circuit as claimed in claim 4 in which said third and fourth digital-to-analog converters are respectively constructed to obtain voltages of step forms in which voltage values per step are smaller than those of said first and second digital-to-analog converters.

6. An automatic white adjusting circuit as claimed in claim 5 in which said first and second primary color signals are red and blue color signals, respectively, and said other signal is a luminance signal.

7. An automatic white adjusting circuit as claimed in claim 5 in which said first and second primary color signals are red and blue color signals, respectively, and said other signals is a green color signal.

8. An automatic white adjusting circuit as claimed in claim 3 in which said switching means is an electronic switching circuit for selectively switching over said supply of said clock pulse.

* * * * *